United States Patent [19]
Delaney

[11] Patent Number: 5,584,638
[45] Date of Patent: Dec. 17, 1996

[54] GUIDED DISK HANDLING SYSTEM

[75] Inventor: Thomas J. Delaney, San Jose, Calif.

[73] Assignee: Exclusive Design Company, Fremont, Calif.

[21] Appl. No.: 344,302

[22] Filed: Nov. 22, 1994

[51] Int. Cl.$^6$ .................................. B23B 31/40
[52] U.S. Cl. .......................... 414/225; 279/2.02; 414/908; 414/589; 369/270
[58] Field of Search .................................. 279/2.01, 2.02, 279/2.03, 2.04; 294/93, 94, 96, 158; 414/908, 225, 589, 729, 741, 754, 757, 777, 779, 294; 369/270, 271, 282

[56] References Cited

U.S. PATENT DOCUMENTS

| | | | |
|---|---|---|---|
| 4,201,394 | 5/1980 | Morawski | 379/2.04 |
| 4,202,639 | 5/1980 | Rello | 414/729 |
| 4,434,684 | 3/1984 | Nixon | 279/2.01 |
| 4,498,165 | 2/1985 | Wilkinsen, Jr. | 369/270 |
| 4,685,206 | 8/1987 | Kobayashi et al. | 414/779 |
| 4,755,981 | 7/1988 | Ekhoff | 279/2.03 |
| 4,944,650 | 7/1990 | Matsumoto | 414/754 |

FOREIGN PATENT DOCUMENTS

| | | | |
|---|---|---|---|
| 2738366 | 3/1979 | Germany | 279/2.02 |
| 292305 | 12/1987 | Japan | 279/2.03 |
| 1068235 | 1/1984 | U.S.S.R. | 279/2.01 |
| 759856 | 10/1956 | United Kingdom | 279/2.04 |
| 8809303 | 12/1988 | WIPO | 414/757 |

Primary Examiner—Karen B. Merritt
Assistant Examiner—Gregory A. Morse
Attorney, Agent, or Firm—Pennie & Edmonds

[57] ABSTRACT

An apparatus for accurately mounting and aligning a disk on a collet is disclosed. The apparatus uses a female guiding member to move along the surface of a protruding male member on the end of the collet. The female guiding member is positioned such that when mated with the male protrusion on the collet, the disk opening is in axial alignment with the collet. The apparatus grips the disk between two posts and a compliant spool. The disk, when held is allowed to move in directions parallel to the plane of the disk.

30 Claims, 8 Drawing Sheets

GUIDED DISK HANDLING SYSTEM

RELATED APPLICATION

The present invention is related to the invention disclosed in U.S. patent application Ser. No. 08/300,277, titled "Disk Clamping Collet System," assigned to the assignee of the present invention, which is herein incorporated by reference.

FIELD OF THE INVENTION

The present invention relates to the field of electromechanical systems for handling disks. Specifically, the present invention relates to a gripping apparatus for gripping magnetic media disks and a guided mounting apparatus for mounting the disks for rotation during texturizing, burnishing and buffing processes.

BACKGROUND OF THE INVENTION

As magnetic media disks are manufactured, they are repeatedly loaded and unloaded onto texturizing equipment for texturizing the surfaces of the disks. Generally speaking, a robotic assembly associated with this texturizing equipment repetitively retrieves individual untexturized disks from a cassette holding a plurality of untexturized disks spaced apart in horizontal axial alignment. The robotic assembly transports the untexturized disk to the texturizing equipment and mounts it on a collet for texturization. After texturization, the robotic assembly grips the mounted individual texturized disk from the collet and returns it to the cassette.

The robotic assembly grips the disk with a gripper apparatus. The gripper apparatus typically comprises a plurality of actuatable fingers disposed about a face to engage the outer circumferential surface of a disk. To grip a disk, the robotic assembly moves the gripper into axial alignment with the disk so that the gripper face is parallel to one of the flat disk surfaces. The robotic assembly moves the gripper towards the disk along the disk axis until the gripper fingers are circumjacent to the outer circumferential surface of the disk. The gripper fingers then close to grip the disk. When the gripper fingers are closed about the outer circumferential surface of the disk, the disk may be transported. To improve the efficiency with which disk texturizing equipment loads and unloads disks, the robotic assembly typically includes two grippers, one for loading disks onto the texturizing equipment and one for unloading disks from the texturizing equipment.

As stated above, the robotic assembly mounts untexturized disks onto a collet on the texturizing equipment. The robotic assembly transports the untexturized into axial alignment with the collet on the texturizing equipment. The robotic assembly moves the untexturized disk forward until the inner circumferential surface of the disk is circumjacent to the collet. An electromechanical system in the texturizing equipment expands the collet to radially clamp the inner surface of the disk. The gripper is opened to release the disk and the robotic assembly is retracted. The texturizing equipment rotates the collet which in turn rotates the disk for texturization.

The process of mounting the disk on the collet is of particular concern. Problems have arisen in light of the need to pack more and more information on each magnetic disk, which has resulted in the utilization of the entire disk surface for memory storage. As a result, the integrity of the entire surface of the disk, including the inner portions close to the opening in the middle of the disk is essential. Any misalignment of the disk while being mounted on the collet may cause the inner circumference of the disk to contact the collet. Such collisions may cause undesirable dents or scratches in the disk.

The problem is exacerbated by the ever-present demand for smaller and lighter memory storage devices. As a result, the thickness of the magnetic media disks has decreased. For example, where as a 3.5" diameter, 500MB disk used to have a thickness of about 0.050", a disk with the same diameter and capacity is now typically less than 0.025" thick. Therefore, these disks are increasing more delicate and susceptible to dents.

Most disk mounting systems according to the prior art rely entirely on the accuracy of the robotic assembly to mount the disks. As stated above, these systems employ grippers that include a plurality of expandable fingers around the outer circumference of the disk to grip the disk from the disk cassette. After the disk is gripped, the robotic assembly rotates into a position where the center of the disk is aligned along the axis of the collet on the texturization equipment. Once in this position, the robotic assembly translates forward to until the inner circumference of the disk circumscribes the outer circumference of the collet.

There are a number of problems with such prior art systems. There is only approximately 7.5 thousandths of an inch difference between the radius of the opening of the disk and the collet. When there is a misalignment between the axis of the disk and the axis of the collet of greater than 7.5 thousandths of an inch, these systems must use the opening in the middle of the disk to guide the disk onto the collet. In other words, the inner circumferential surface hits the collet and bounces the disk into alignment. As stated above, all such contact is undesirable because the integrity of the entire disk surface is essential.

This problem is exacerbated by the need to process more disks in less time. As a result, the industry uses ever faster robotic assemblies to cycle disks through each texturization process. High speed rotation of these robotic assembly generates high magnitude moments, which in turn produce oscillatory motion. This oscillatory motion in the robotic assembly makes proper alignment during mounting significantly more difficult.

In order to minimize the alignment problems, the industry has been forced to employ extremely expensive, complex and delicate robotic assemblies. Even with these systems, disks still tend to get dented or scratched during mounting. In addition, complex robotic assemblies are susceptible to breakdown.

Alternative prior art disk mounting systems employ one or more guide pins projecting out from the gripper face along an axis perpendicular from the face. These guide pins work in cooperation with one or more guide holes located on the disk texturizing equipment adjacent to the collet in a male/female relationship. Typically the guide pins have a tapered nose section so that when initial positioning of the gripper is slightly off-center the guide pins still fit into the guide holes.

There are a number of disadvantages associated with this type of prior art disk mounting system. A degree of inaccuracy is introduced because the aligning guide holes are offset from target collet. Precise placement of the guide holes and guide pins is important since any variance between the guide hole or guide pin position and the collet will result in misalignment of the disk during mounting. Such precise placement requires added complexity and expense to the overall system.

Additionally, the slightest displacement of the collet or bending of the guide pins will result in repeated misalignment of the disk during mounting. Moreover, the guide pins add additional weight to the robotic assembly. Therefore, the problem associated with high speed rotation of these robotic assembly (i.e. producing oscillatory motion) is magnified.

Note that a range of motion must be provided by the gripper when using tapered guide pins to compensate for inaccuracies in the initial alignment of the gripper. As the guide pins are fastened to the gripper face, typically the entire gripper subassembly moves during alignment. The speed at which disks can be mounted is limited by the mass required to move during alignment of the disk. As gripper subassemblies used in tapered guide pin and hole mounting systems are relatively complex and massive, this represents a further disadvantage of these systems.

An additional disadvantage associated with each of the prior art disk mounting systems described above is disk damage occurring along the outer circumferential surface of the disk. The damage results from the actuation of the actuatable gripper fingers. As described above, the industry is using smaller and lighter disks in memory storage devices and these disk are more susceptible to dents.

It is therefore an object of the invention to provide a simple and inexpensive apparatus for accurately mounting disks on disk texturizing equipment that avoids using the inner circumference of the disk as a guiding element.

It is a further object of the invention to provide an apparatus for accurately mounting disks on disk texturizing equipment that does not rely solely on the accuracy of the robotic assembly.

It is a further object of the invention to provide a simple and lightweight guiding apparatus that uses a guiding means which simply and inexpensively may be positioned relative to the collet.

It is a further object of the invention to provide an apparatus for accurately mounting disks on disk texturizing systems which provides a range of motion in the disk during alignment of the disk, without excessive weight which must be moved along with the disk, thereby allowing high speed disk mounting.

It is a further object of the invention to prevent dents or scratches from occurring at the outside circumference of the disk when gripped by the gripping apparatus.

SUMMARY OF THE INVENTION

In order to meet these objectives, the present invention is directed to an apparatus for accurately mounting and aligning a disk on a collet which uses a female guiding member to move along the surface of a protruding male member on the end of the collet. The female guiding member is positioned such that when mated with the male protrusion on the collet, the disk opening is in axial alignment with the collet.

The apparatus, in accordance with the invention, advantageously uses the end of the collet itself to guide and align the disk on the collet. Thus the apparatus does not have to rely solely on the accuracy of a robotic assembly, thereby avoiding cost and complexity.

Moreover, since the apparatus uses a protruding male member on the collet itself to guide the disk onto the collet, it is relatively inexpensive and simple to guarantee a maximum variance between the axes of the collet and the male protruding guide member. Thus the apparatus advantageously avoids problems of misalignment due to variance between the position of the collet and extraneous holes or pins mounted adjacent to the collet.

Additionally, in the preferred embodiment, the disk mounting apparatus holds the disk using movable plates and arms such that the disk can be moved during alignment without moving the entire gripper subassembly. Thus the present invention is also advantageously capable of high speed disk mounting, as the mass being moved during alignment is relatively small.

In the preferred embodiment, the apparatus includes an actuator for closing disk holding pins onto the periphery of the disk and a shock absorber to dampen the force of the holding pins contacting the disk. Thus, in this embodiment, the apparatus advantageously avoids damaging the outer surface the disk.

BRIEF DESCRIPTION OF THE DRAWINGS

The above mentioned structures and other structures, features, aspects and advantages of the present invention will become better understood with regard to the following detailed description, which should be read in conjunction with the accompanying drawings in which.

DETAILED DESCRIPTION OF THE INVENTION

Figure 1:
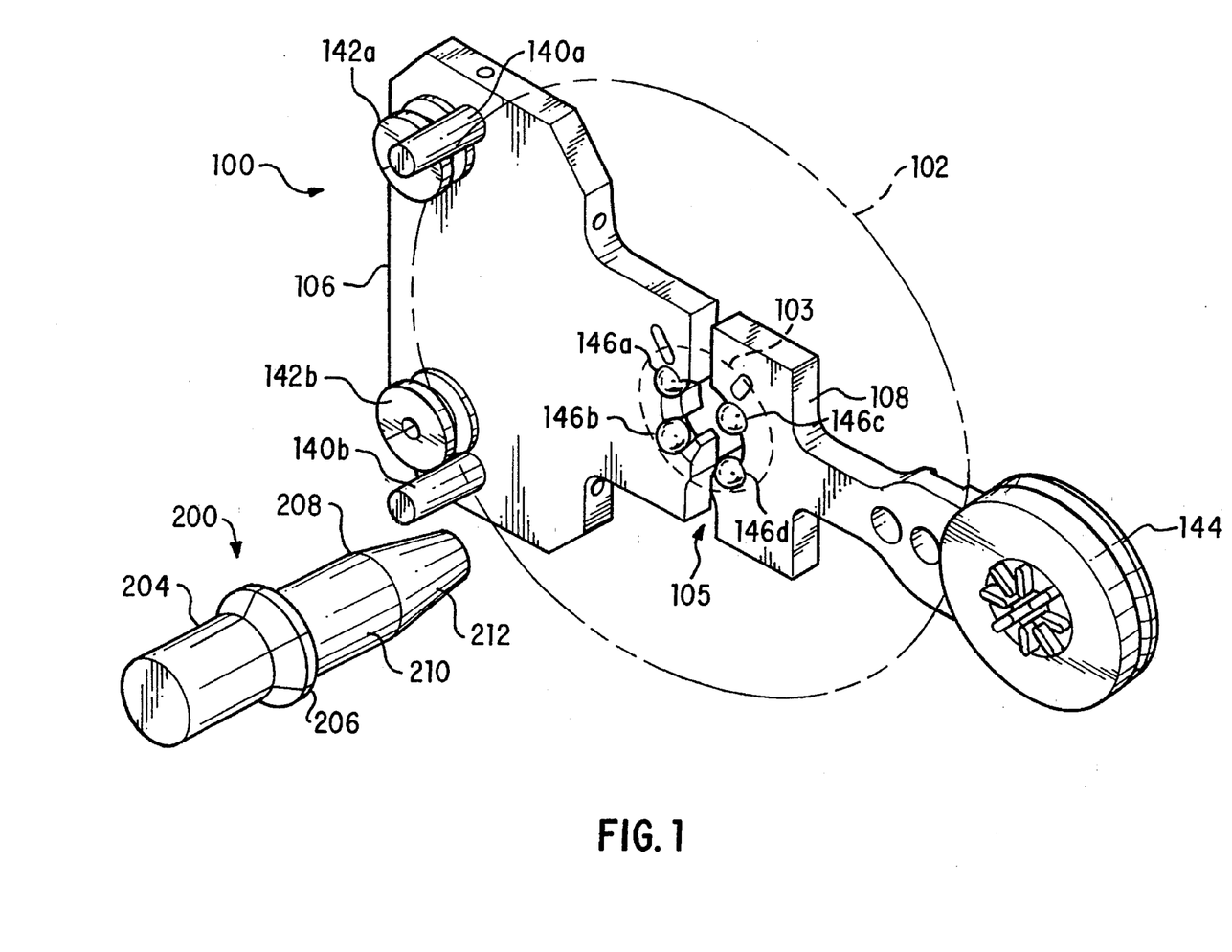
FIG. 1 shows a front perspective view of portions of a guided disk handling system according to the present invention, and portions of a collet system on which a disk is to be mounted.

As shown in FIG. 1 the present invention is directed to a guided disk handling system 100 for aligning disks 102 on a collet system 200. More specifically, the guided disk handling system 100 accurately positions the disk 102 having an opening 103, about the collet system 200 such that the inner surface of opening 103 is positioned about a disk contact ring 206 of the collet system 200.

Figure 2:
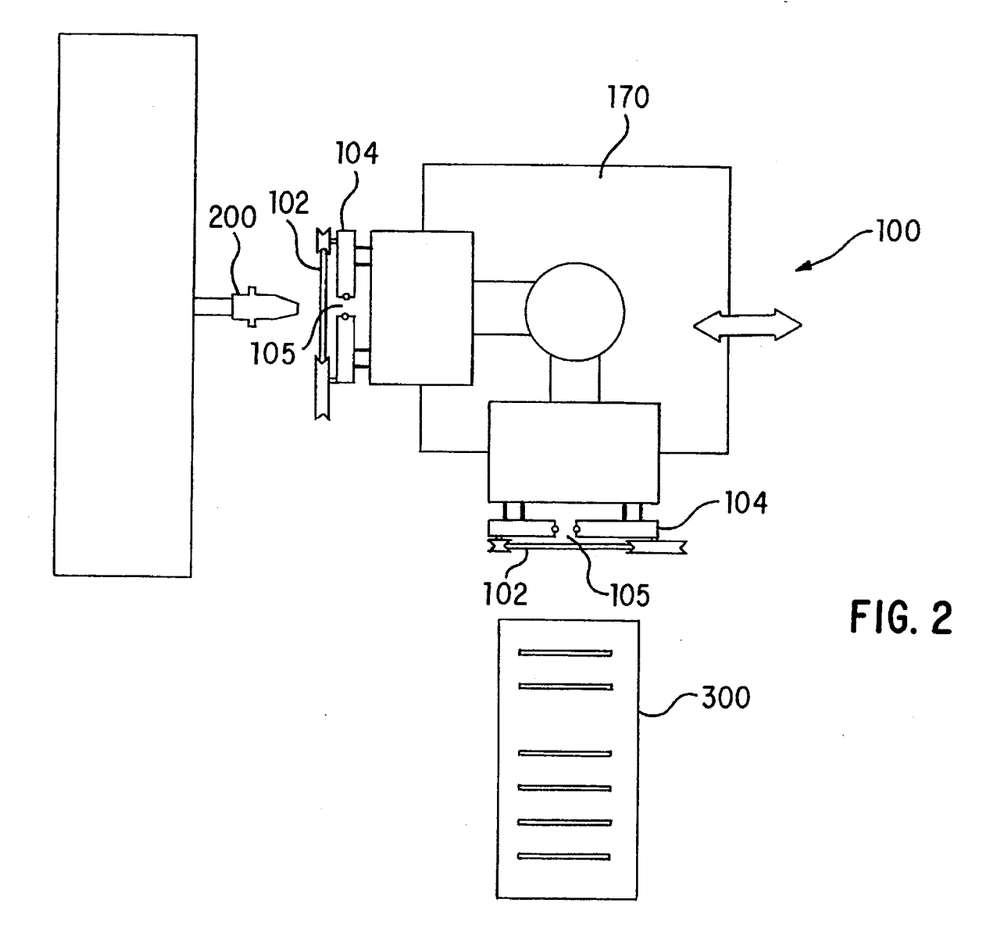
FIG. 2 is a top view of the guided disk handling system according to the present invention, the collet system, and a disk cassette.

As shown in FIG. 2 the guided disk handling system 100 comprises a robotic platform 170, disk holding systems 104 and disk guiding systems 105. The robotic platform 170 carries the disk holding and guiding systems 104, 105 to retrieve and return disks to a disk cassette 300 and to mount and demount disks on the collet system 200. The disk holding and guiding systems 104, 105 are attached to the robotic platform 170.

The robotic platform 170 rotates in both directions and translates both forward and backward. When retrieving and returning disks 102 to and from the disk cassette 300 or when mounting and demounting the disks 102 on the collet system 200, the robotic platform 170 maintains the disk holding and guiding systems 104 and 105 in a proper alignment, such that the disks 102 may be retrieved, returned, mounted or dismounted. Note that the robotic platform 170 preferably maintains the disk holding and guiding systems 104, 105 in proper alignment with respect to the plane of the disks 102 as well as with respect to the lateral position of the disks 102.

Figure 3:
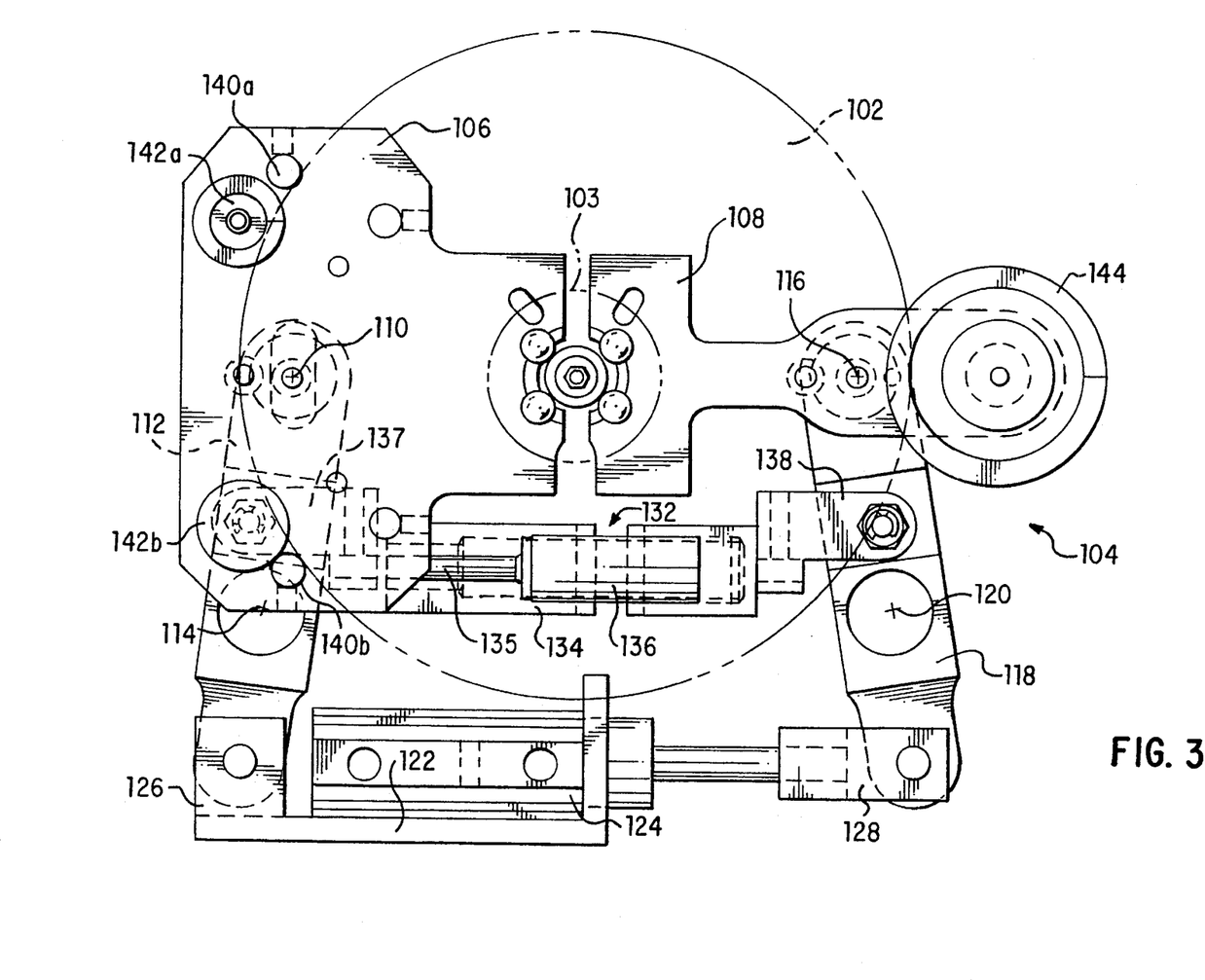
FIG. 3 is a front view of a guided disk handling system according to the preferred embodiment of the present invention.

FIG. 3 shows a front view of the disk holding system 104 and the disk guiding system 105 according to the present invention. The disk holding system 104 comprises a first arm 112 and a second arm 118. The first arm 112 is attached to the robotic platform 170 at a first arm pivot point 114, such that the first arm 112 pivots along a plane parallel to the disk 102. Similarly the second arm 118 is attached to the robotic platform 170 at a second arm pivot point 120, such that the second arm 118 pivots along a plane parallel to the disk 102.

The disk holding system further comprises a first holding plate 106 and a second holding plate 108. The first and second holding plates 106 and 108 are preferably in a substantially co-planar orientation. The first holding plate 106 is attached at a first plate pivot point 110 to the first arm 112 such that the first holding plate 106 is allowed to pivot with respect to the first arm 112, along a plane parallel to the disk 102. In a like manner, the second holding plate 108 is attached at a second plate pivot point 116 to the second arm 118 such that the second holding plate 108 is allowed to pivot with respect to the second arm 118, along a plane parallel to the disk 102.

As shown in FIG. 3, the first arm 112 and the second arm 118 are connected to an actuator assembly 122. The actuator assembly 122 controls the opening and closing of the disk holding system 104. The actuator assembly 122 comprises an actuator cylinder 124, a cylinder base 126, and an actuator link 128. The first arm 112 has a tapered portion which fits into a notched section of the cylinder base 126. The tapered portion of the first arm 112 is attached to the cylinder base 126 by a pin, which allows the first arm 112 to pivot along the axis of the pin in a plane parallel to the disk 102. The second arm 118 has a tapered portion which fits into a notched section of the actuator link 128. The tapered section of the second arm 118 is attached to the actuator link 128 with a second pin, which allows the second arm 118 to pivot along the axis of the second pin in a plane parallel to the disk. The actuator cylinder 124 is held by the cylinder base 126. When the actuator cylinder 124 actuates, a rod is forced laterally outward and pushes on the actuator link 128. As can be seen in FIG. 3, the pushing action of the actuator cylinder 124 acts to pivot the first arm 112 about the first arm pivot point 114 in a clockwise direction, and pivot the second arm 118 about the second arm pivot point 120 in a counter clockwise direction. The pivoting action of the first and second arms 112 and 118, in turn, act to force the first and second disk holding plates 106 and 108 toward each other, and as described below, thereby grip the disk.

The first arm 112 and the second arm 118 are also connected to a shock absorber assembly 132. The shock absorber advantageously acts to dampen the closing force of the actuator assembly 122 when gripping a disk. This prevents the gripping action of the holding plates 106, 108 from imparting any damage on the outer circumference of the disk 102. The shock absorber assembly 132 comprises a first shock absorber housing 134 which has a sliding pin 135 located such that it impinges upon the actuating rod of a shock absorber 136. Pin 135 is attached to a shock absorber link 137. The shock absorber 136 is attached to the shock absorber housing 134 in such a manner that the sliding pin 135 contacts the actuating rod of the shock absorber 136. The opposite end of the shock absorber 136 is attached to a second shock absorber housing 138. The first arm 112 is connected to the shock absorber link 137 using a retaining pin such that the first arm is allowed to pivot with respect to the shock absorber link 137 along the axis of the retaining pin. Similarly, the second arm 118 is connected to the second shock absorber housing 138 using a retaining pin such that the second arm is allowed to pivot with respect to the second shock absorber housing 138 along the access of the retaining pin. As can be seen in FIG. 3 the shock absorber 136 preferably acts to dampen pivoting of first and second arms 112 and 118.

Attached to the first holding plate 106 are disk contact posts 140a and 140b, which extend in a forward direction from and perpendicular to the first holding plate 106. While two disk contact posts are shown, one of ordinary skill in the art will realize that more than two disk contact posts may also be used. The disk contact posts 140a and 140b hold the outer circumference of the disk 102 when the disk holding system 104 is closed. The disk contact posts 140a and 140b are preferably made of a hard material relative to the composition of the disk such as tungsten carbide. This prevents grooves from forming on the disk contact posts 140a and 140b from repeated gripping. One skilled in the art will realize that any sufficiently hard material could be used. Also attached to first holding plate 106 are retaining spools 142a and 142b. Attached to second holding plate 108 is a compliant spool 144. While one compliant spool 144 is shown, one of ordinary skill in the art will realize that more than one compliant spool may also be used. The retaining spools 142a, 142b and the compliant spool 144 limit the disk 102 to a substantially co-planar position relative to the first and second holding plates 106 and 108.

Referring again to FIG. 1, disk contact posts 140a and 140b, as well as retaining spools 142a and 142b are attached to the first holding plate 106. An elastomer grommet 148 fits into the inner section of compliant spool 144. In the preferred embodiment of the invention, the elastomer grommet 148 acts so that the compliant spool 144 is moveable with respect to the second disk holding plate 108 in directions along the plane of the second disk holding plate 108. More specifically, the compliant spool 144 must be movable in a lateral direction towards and away from holding plate 106. As discussed more fully below, the compliant spool 144 should maintain contact with the periphery of the disk 102 in the event that the holding plates 106 and 108 move with respect to each other during the disk mounting process.

The disk contact posts 140a and 140b, and the compliant spool 144 are positioned on the first disk holding plate 106 and the second disk holding plate 108 such that when the disk 102 is being held its outer circumferential surface is contacted by the disk contact posts 140a and 140b and the compliant spool 144. Additionally, retaining spools 142a and 142b and compliant spool 144 are positioned so that they limit disk 102 to a position substantially co-planar to the first and second disk holding plates 106 and 108.

Figure 4A:
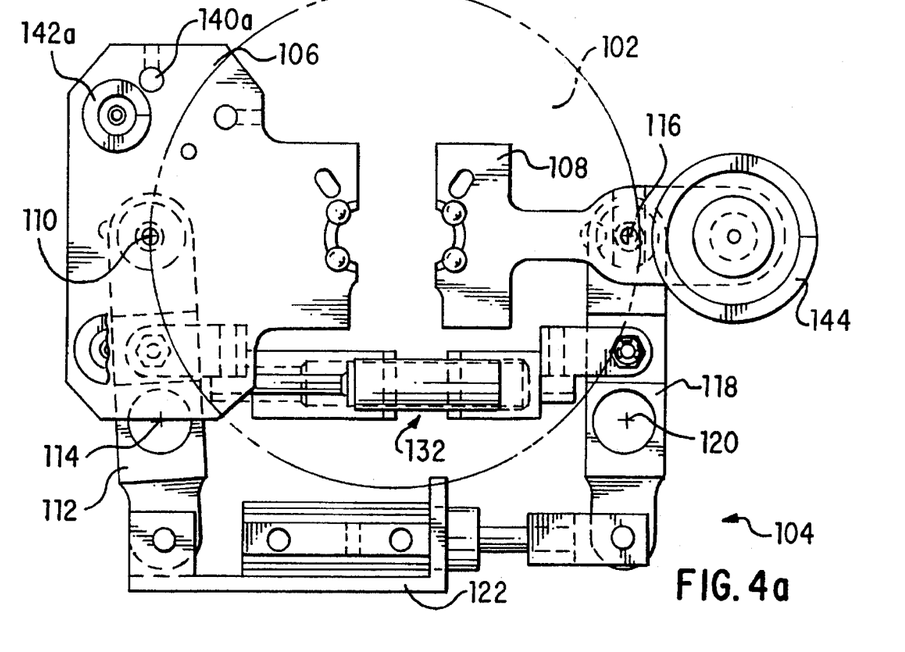
FIGS. 4a and 4b show the disk gripping action of the disk holding system according to the preferred embodiment of the present invention.
Figure 4B:
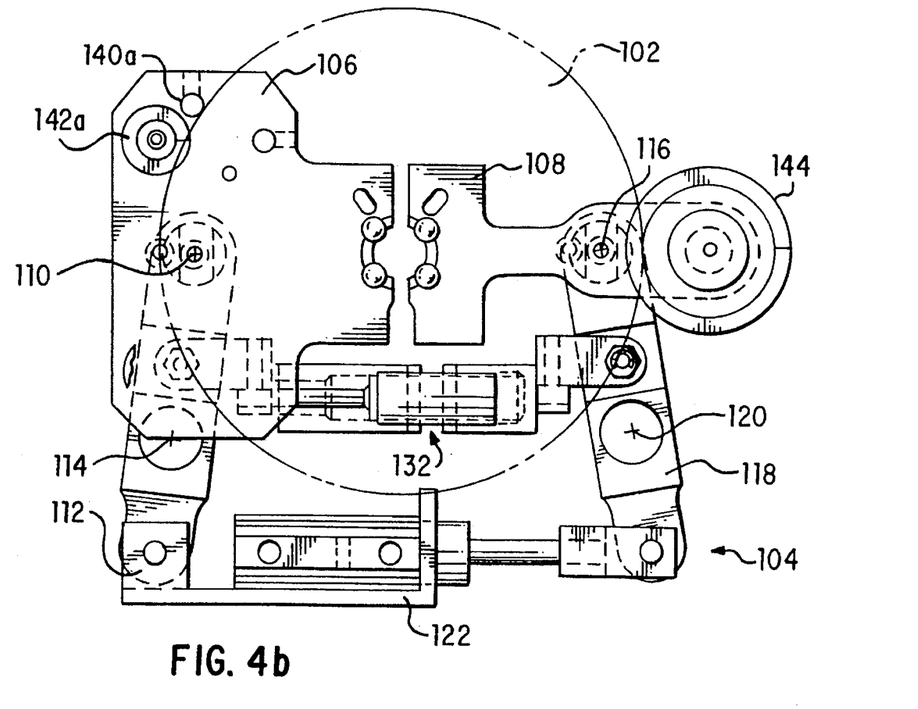

FIGS. 4a and 4b show the disk gripping operation of the disk holding system 104 in the preferred embodiment of the invention. FIG. 4a shows the disk holding system 104 in an open position. In an open position, the actuator assembly 122 is in a laterally contracted position. Note that first and second arms 112 and 118 are positioned such that first and second holding plates 106 and 108 are spread apart, and disk contact posts 140a and 140b, retaining spools 142a and 142b, and compliant spool 144 are not in contact with the disk 102.

Closing of the disk holding system 104 is achieved in the preferred embodiment by causing the actuator assembly 122 to expand laterally such that first and second arms pivot around first and second pivot points 114 and 120, thereby forcing first and second disk holding plates 106 and 108 towards each other.

FIG. 4b shows the disk holding system 104 in a closed position. In this position, the actuator assembly 122 is laterally expanded such that disk holding plates 106 and 108 are positioned relatively close to one another. More specifically, disk holding plates 106 and 108 are positioned such that disk contact posts 140a and 140b, and compliant spool 144 contact the outer circumference of the disk 102. In the closed position, the actuator assembly 122 exerts sufficient outward pressure on the first and second arms 112 and 118, to hold the disk 102 firmly between disk contact posts 140a and 140b, and compliant spool 144. For example, in the preferred embodiment actuator cylinder comprises a ½ inch air cylinder and actuates in the range of 20 to 25 psi.

Note that in the preferred embodiment, when the disk holding system 104 is moving from an open position to a closed position, the motion caused by the actuator assembly 122 is dampened by shock absorber 132 such that when disk contact posts 140a–b and compliant spool 144 contact with the disk 102, neither damage nor permanent deformations of the disk 102 are caused.

Figure 5A:
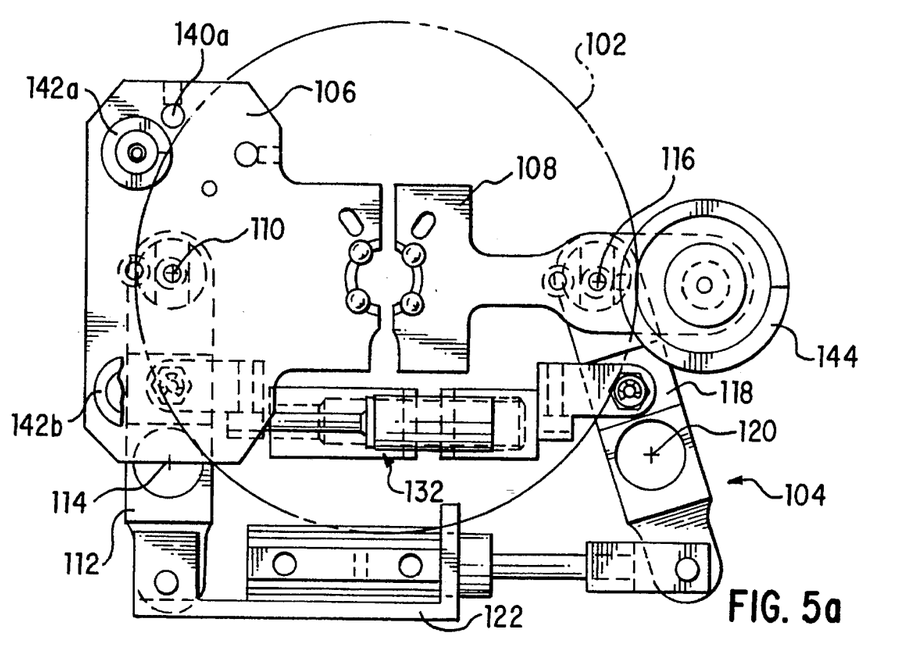
FIGS. 5a–d show how the guided disk handling system is capable of moving in horizontal and vertical directions in the preferred embodiment of the present invention.
Figure 5B:
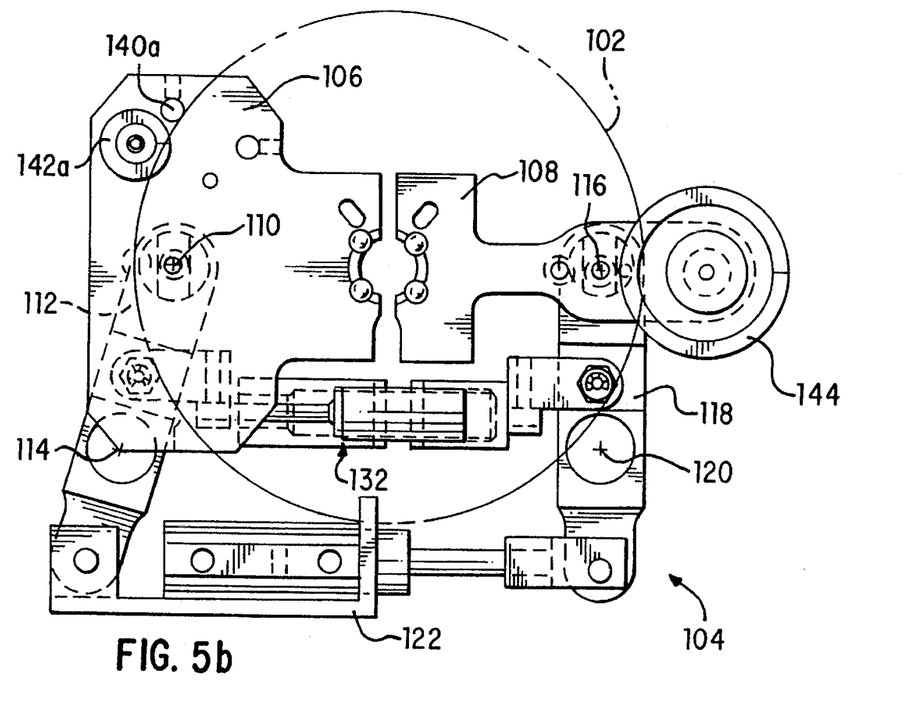

FIGS. 5a–d show, in the preferred embodiment, the movement of the disk 102 in directions parallel to the plane of the disk 102 while being held by disk holding system 104. FIGS. 5a and 5b show, in the preferred embodiment, the horizontal movement of the disk 102. The disk holding system 104 is shown in a closed position, holding the disk 102. Recall that first and second arms 112 and 118 are connected to the robotic platform such that first and second arms 112 and 118 are allowed to pivot with respect to robotic platform along a plane parallel to the disk 102. While in the closed position, as shown in FIGS. 5a and 5b, the pivoting action of first and second arms 112 and 118 allowed along the axes of first and second arms 112 and 118, provide movement of the first and second holding plates 106 and 108 in a horizontal direction. Note that the first and second holding plates 106 and 108 preferably pivot slightly about the first and second holding plate pivot points 110 and 116, such that first and second holding plates 106 and 108 are capable of maintaining a firm grip of the disk 102 while being moved horizontally.

Figure 5C:
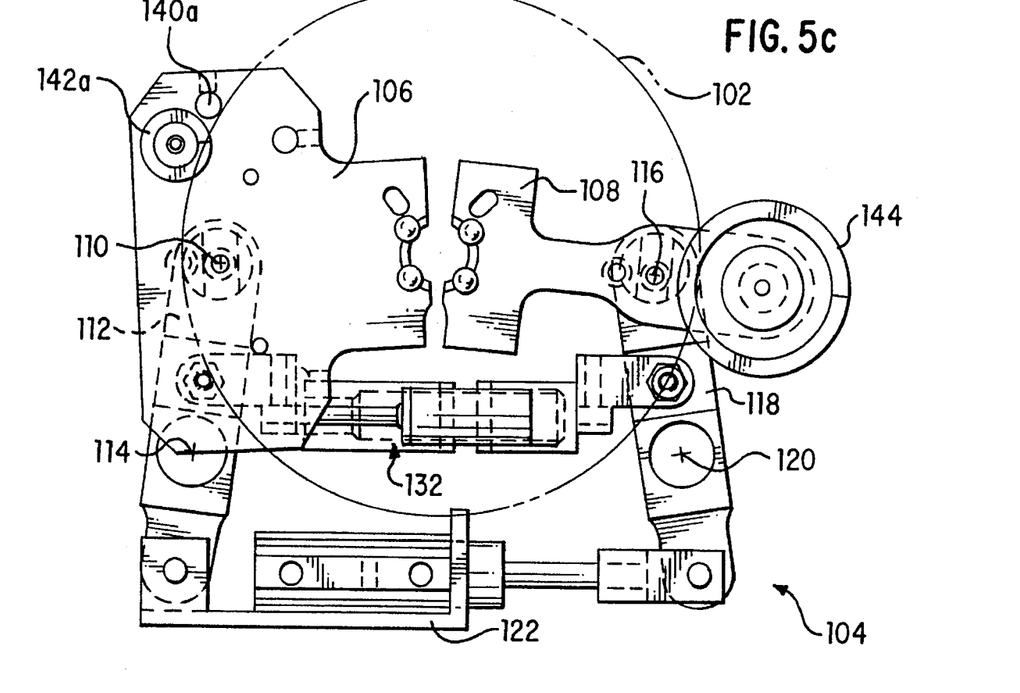
Figure 5D:
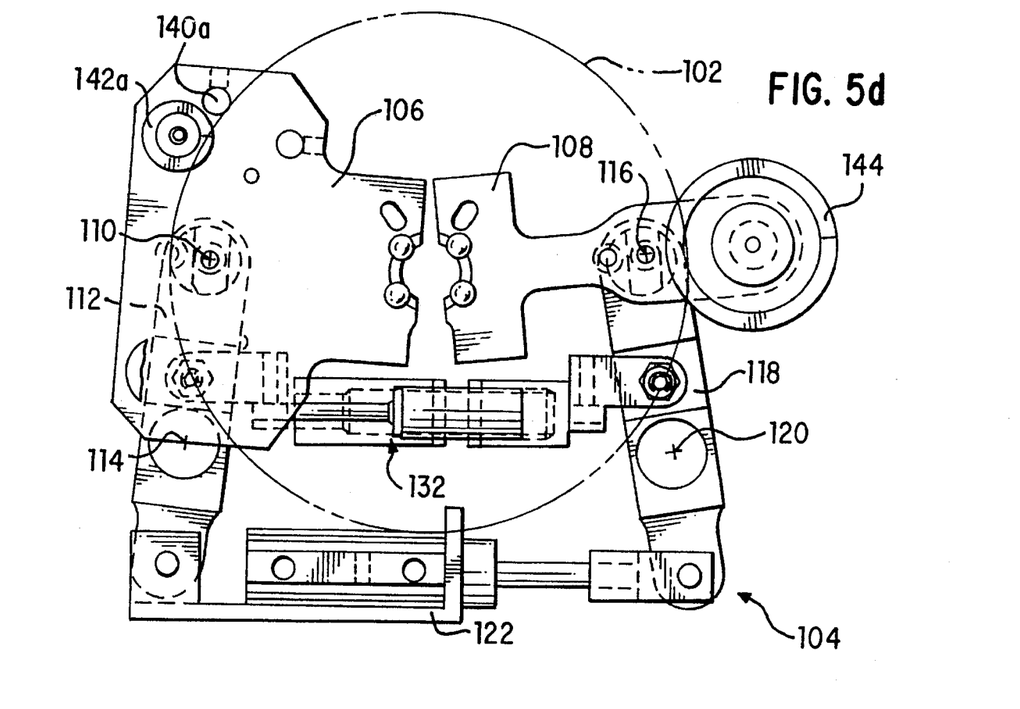

FIGS. 5c–d shows, in the preferred embodiment, the movement in the vertical direction of the disk 102 while being held by the disk holding system 104. In the preferred embodiment of the invention, vertical motion of the disk 102, while being firmly held by the disk holding system 104 is achieved primarily by the first and second holding plates 106 and 108 pivoting at the first and second holding plate pivot points 110 and 116 along a plane parallel to the disk 102. Note that while disk holding plates 106 and 108 are pivoting, disk contact posts 140a and 140b, and compliant spool 144 may slide along the outer edge of disk 102 while maintaining a firm grip on disk 102. Note also that the first and second arms 112 and 118 may pivot slightly during the vertical motion of disk 102.

Thus the disk holding system 104 has the advantage of allowing both vertical and horizontal movement of disk 102 while maintaining a firm grip on disk 102.

Note that the range of motion as shown in FIGS. 5a–d is generally exaggerated in order to illustrate how the movement is achieved. As discussed below, the actual range of motion of the disk 102 is limited in the preferred embodiment.

Next, in accordance with the invention, the guiding system 105, as shown in FIG. 1, will be described which provides accurate positioning of the disk 102 about the collet system 200. Guiding balls 146a and 146b are shown to be fastened to the first holding plate 106 on the edge facing the second holding plate 108. Similarly, guiding balls 146c and 146d are shown to be fastened to the second holding plate 108 on the edge facing the first holding plate 106. In the preferred embodiment, guiding balls 146a–d are precision balls made of a relatively hard material such as tungsten carbide, although one skilled in the art will recognize that any sufficiently hard material having a spherical end portion may be substituted. The facing edges of first and second disk holding plates 106 and 108 have concave sections Such that an opening is present which corresponds to the opening of a disk being held. In the preferred embodiment, the opening formed by the concave sections on disk holding plates 106 and 108 and the guiding balls 146a–d is of a smaller diameter than the opening on the disk being held.

The guiding system 105 for positioning the disk 102 on the collet system 200 according to the preferred embodiment of the present invention will now be further described. Referring again to FIG. 1, collet system 200 is shown which comprises an expandable portion 204, the disk contact ring 206, and a guiding portion 208. The expandable portion 204 further comprises expandable fingers which are caused to expand outward. The expandable portion 204 is shown in FIG. 1 to have six expandable fingers, although in general a different number of fingers is possible. The disk contact ring 206 is also made up of segments, each of which are integral with each of the expandable fingers of expandable portion 204. Thus the collet system 200 is capable of causing the disk contact ring 206 to expand radially outward to securely clamp a correctly positioned disk by exerting radial pressure on the inner surface of the opening 103 of the disk 102. As shown in FIG. 1, the guiding portion 208 further comprises a cylindrical section 210 and a tapered section 212. According to the invention and as discussed more fully below, both the cylindrical section 210 and the tapered section 212 should be coaxial with disk contact ring 206 in order to ensure accurate placement of the disk 102 about the disk contact ring 206.

FIG. 1 also shows front perspective view of the disk 102 held by first and second holding plates 106 and 108. According to the preferred embodiment, the disk 102 and the first and second holding plates 106 and 108 are moved forward by the robotic platform such that the opening 103 of the disk 102 as well as the opening formed by the concave sections of disk holding plates 106 and 108, and the guiding balls 146a–d move substantially along the axis of the collet toward the guiding portion 208. As the disk 102 and disk holding plates 106 and 108 move forward toward the collet system 200, one or more of the guiding balls 146a–d eventually come in contact with the tapered section 212 of the collet system 200. Note, referring back to FIGS. 5a–d, that the disk holding system 104 allows the disk to move in all directions in a plane parallel to the plane of the disk 102. As the disk 102 and the first and second holding plates 106 and 108 continue to move forward all of the guiding balls 146a–d come in contact with the outer surface of tapered section 212.

Due to the capability of disk 102 to move in all directions parallel to the plane of the disk 102, the initial position of the disk 102 and holding system 104 does not need to be precisely coaxial to the collet system 200. Provided that the nose of the tapered section 212 initially passes between the guiding balls 146*a–d*, the guided disk holding system 100 is advantageously capable of "self aligning" itself, such that the opening 103 of the disk 102 becomes substantially coaxial to the cylindrical section 210, as the guiding balls 146*a–d* traverse along the tapered section 212 and on to the cylindrical section 210. In other words, although the robotic platform may initially position the disk in an off-center position, the guiding system 105 is capable of using the tapered section and the cylindrical section to center the disk about the axis of the collet system.

Moreover, during self alignment, only the disk, the plates and the arms are required to move to the new position, not the more massive structures in the robotic platform. As the total mass required to move during self-alignment is relatively small, the guided disk handling system can advantageously mount disk with increased speed. For example, in the preferred embodiment, the aligning process can be as fast as 1/10 of a second.

Note that, in the preferred embodiment, depending on the initial position of the holding plates 106 and 108, as the guiding balls 146*a–d* move forward along the tapered section 212 and onto the cylindrical section 210, the holding plates 106 and 108 will be spread apart from each other slightly in order to accommodate the larger diameters of the tapered section 212 and the cylindrical section 210. In the event that holding plates 106 and 108 move apart slightly, compliant spool 144 preferably maintains contact with the outer circumferential surface of disk 102 causing the disk to maintain contact with the disk contact posts 140*a–b*.

Figure 6:
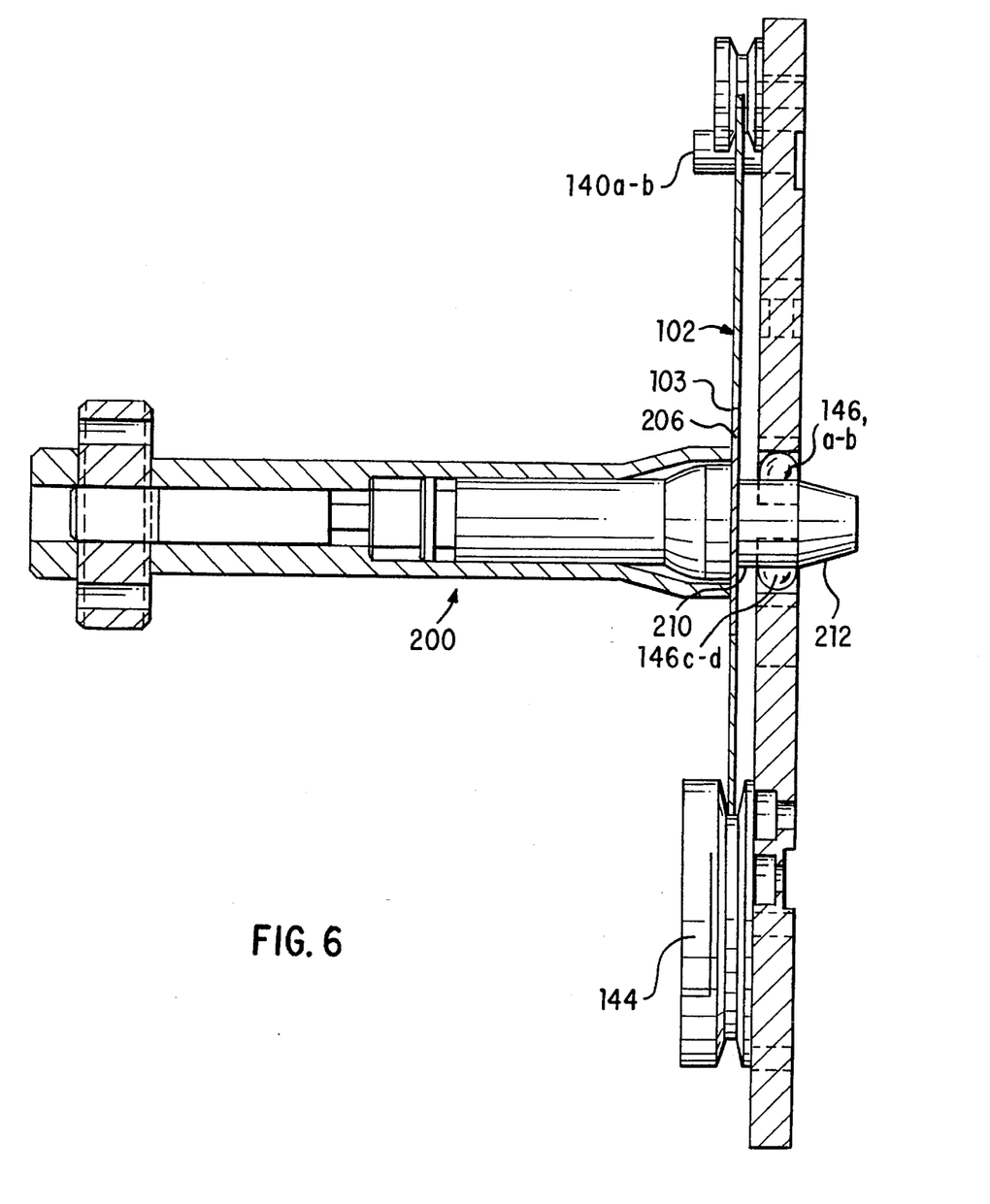
FIG. 6 shows a cross section top view of portions of the guided disk handling system where the disk is in a mounted position about the collet system, according to the preferred embodiment of the present invention.
Figure 7:
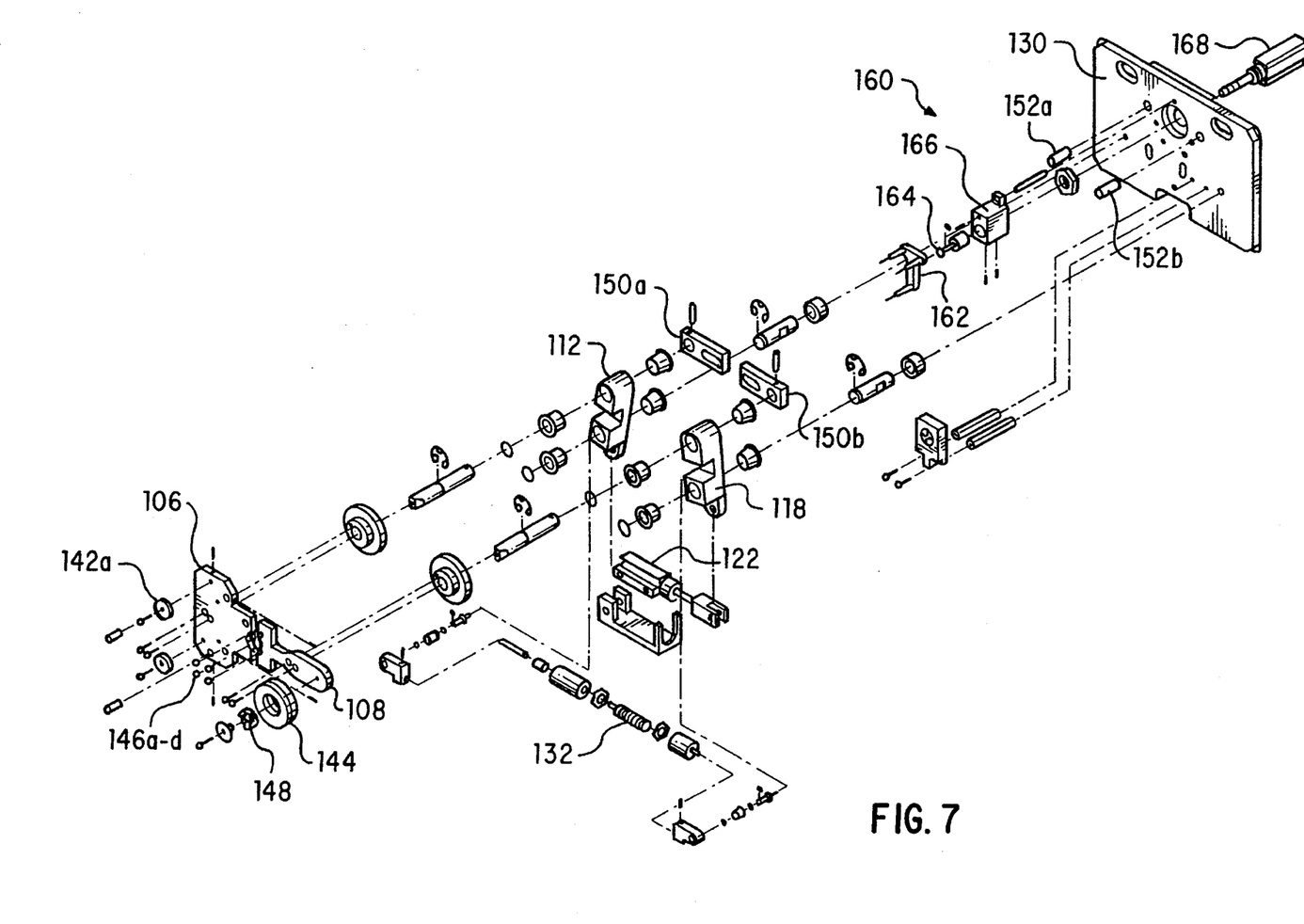
FIG. 7 shows an exploded view of the preferred embodiment of the guided disk handling system without the support structure.

FIG. 6 shows a cross section top view, according to the preferred embodiment, where the four guiding balls 146*a–d* are in contact with the cylindrical section 210 and the opening 103 of the disk 102 is correctly positioned about the disk contact ring 206 of collet system 200. As shown in FIG. 7, the opening 103 is substantially concentric with the disk contact ring 206. In the preferred embodiment, the concentricity of the opening 103 and the disk contact ring 206 is within 7.5 thousandths of an inch.

In order to achieve such precision concentricity between the opening 103 and the contact ring 206, the disk contact posts 140*a–b* and the guiding balls 146*a–b* should be precisely located. The "disk guiding calibration length" is herein defined as the projection in the plane of the disk 102 of a line drawn between the point which contacts the disk 102 on the disk contact post 140*a*, and the point which contacts the cylindrical section 210 on the guiding ball 146a. According to the preferred embodiment, the disk guiding calibration length should be equal to the difference in the radii of the cylindrical section 210 and the disk contact ring 206, added to difference in radii of the disk contact ring 206 and the opening 103 of disk 102, added to the difference of the radii of the opening 103 and the outer circumferential edge of disk 102. In the preferred embodiment the disk contact posts 140*a–b* and the guiding balls 146*a–b* should be placed so as to be within 1 thousandth of an inch to the disk guiding calibration length.

Additionally it is also important that outer surface of cylindrical section 210 be substantially coaxial with the disk contact ring 206, so that the guiding system 105 accurately positions the disk 102 about the disk contact ring 206. For example, in the preferred embodiment the axis of the cylindrical section 210 and the axis of the disk contact ring 206 are preferably within +/−2 thousandths of an inch of each other.

Recall that during the aligning process, the nose of the tapered section 212 initially should pass between the guiding balls 146*a–d*, in order for the guided disk holding system 100 to align itself. The robotic platform should initially position the holding and guiding systems 104, 105 along with the disk 102 within some margin to the axis of the collet system. For example, in the preferred embodiment, the axis of the opening 103 of the disk 102 must initially be within 50 thousandths of an inch to the axis of the tapered section 212.

In the preferred embodiment of the invention, although the accuracy of the placement of the opening 103 of disk 102 with respect to the disk contact ring 206 is preferably around 7.5 thousandths of an inch, the accuracy of the initial position of the guided disk handling system 100 with respect to the axis of collet system 200 only has to be within 50 thousandths of an inch. Thus, in the preferred embodiment, the robotic platform advantageously does not need to provide the level of accuracy that has been required in prior art disk handling systems. This represents a considerable advantage over the prior art in terms of the cost, complexity and accuracy of the overall system.

FIG. 7 shows an exploded view of the preferred embodiment of the guided disk handling system 100, except that the support structure 50 is not shown. Note that in the preferred embodiment limit blocks 150*a* and 150*b* are provided. The limit blocks 150*a* and 150*b* are attached to the holding plates 106 and 108 at the holding plate pivot points 110 and 116, such that the limit blocks 150*a* and 150*b* pivot along with the holding plates 106 and 108. The limit blocks 150*a* and 150*b* have openings into which fit limit block posts 152*a* and 152*b*. The limit block posts 152*a* and 152*b* are fastened to the base 130. The openings on the limit blocks 150*a* and 150*b* are larger than the diameter of the limit block posts, so that the limit blocks 150*a* and 150*b* and therefore the holding plates 106 and 108 are allowed a certain range of motion both in terms of pivoting about the holding plate pivot points 110 and 116, and in terms of horizontal motion allowed by pivoting the arms 112 and 118.

The limit blocks 150*a* and 150*b* should limit the rotation of the holding plates 106 and 108 such that the disk being held has a range of motion equal to or greater than the minimum accuracy of the guided disk handling system 100 with respect to the axis of the collet system. This is so that the movement of the holding plates 106 and 108 can make up for any possible inaccuracy of the support structure 50 and other elements of the guided disk handling system 100. As mentioned above, in the preferred embodiment the accuracy of the position of the guided disk handling system 100 with respect to the collet system 200 is around 50 thousandths of an inch. Thus, in the preferred embodiment the limit blocks should be designed to allow at least 50 thousandths of an inch of motion by a disk being held. For example in one embodiment the limit blocks 150*a* and 150*b* allow a range of motion in the disk 102 to 60 thousandths of an inch.

Also shown in FIG. 7 is a disk pusher subassembly 160. The disk pusher subassembly 160 comprises a three pin base 162, which is connected to a pusher anti-rotation block 166, which is connected to a pusher cylinder 168. The pusher cylinder 168, in turn is fastened to the base 130. The disk pusher subassembly 160 operates preferably to ensure precise alignment of the disk about the disk contact ring on the collet system (not shown). The disk pusher subassembly 160 operates to push the disk 102 against retractable disk register pads (not shown) which are preferably part of the collet system. Once the disk 102 is positioned about the disk contact ring, the pusher cylinder 168 extends laterally, causing the anti-rotation block and the three pin base 162 to move forward and push the disk against the register pads. Additionally, the three pin base 162 is connected to the pusher anti-rotation block 166 using an elastomer washer 164, which allows the three pin base 162 to comply slightly in order to ensure that all three pins touch the disk 102 even when the disk 102 is not initially completely parallel with the disk handling system 104.

Although the present invention has been described in considerable detail with reference to the preferred embodiment thereof, the present invention is not limited to uses in connection with disk texturizing systems. One skilled in the art will recognize that the present invention may be used to handle and align any disk having an opening where accurate placement on a rotating device is required.

What is claimed is:

1. An apparatus for coaxially aligning a central opening in a disk about a rotational member, the rotational member being coaxially disposed about a protruding male guiding member, comprising:

a female guiding member disposed at the interior of the central opening of a held disk, said female guiding member having a reference surface; and a disk positioning member which contacts the outer circumferential surface of the disk, said disk positioning member positioned at a predetermined distance from the reference surface, wherein the reference surface is adapted to traverse the outer surface of the male guiding member.

2. An apparatus as recited in claim 1, wherein the holder comprises a first holding plate and a second holding plate, the first and second plates being substantially co-planar and substantially parallel to the face of a disk.

3. An apparatus as recited in claim 2 wherein the first and second holding plates are bidirectionally movable in a first direction.

4. An apparatus as recited in claim 3 wherein the first and second holding plates are bidirectionally movable in a second direction.

5. An apparatus as recited in claim 2, wherein the holder further comprises:

at least two positioning members disposed on the first plate to contact the outer circumferential surface of a held disk; and at least one holding member disposed on the second plate to contact the outer circumferential surface of a held disk.

6. An apparatus as recited in claim 2 wherein the first and second holding plates pivot about axes parallel to the axis of the rotational member.

7. An apparatus as recited in claim 2 wherein the female guiding member is attached to the first plate.

8. An apparatus as recited in claim 2 wherein the female guiding member comprises at least two reference surfaces attached to the first plate.

9. An apparatus as recited in claim 1, wherein the rotational member and the male guiding member have circular cross sections.

10. An apparatus as recited in claim 1, wherein the male guiding member comprises a cylindrical section and a tapered section.

11. An apparatus as recited in claim 1 wherein the reference surface traverses the outer surface of the male guiding member.

12. An apparatus as recited in claim 1 wherein the radial distance between the reference surface and said disk positioning member is substantially equal to the radial distance from the outer circumferential surface to the central opening of the disk, added to the difference between the radii of the rotational member and the protruding male guiding member, added to the difference between the radii of the rotational member and the central opening of the disk.

13. An apparatus for gripping a disk comprising:

a first holding plate and a second holding plate, the first and second plates being substantially co-planar and substantially parallel to a disk;

a support arm configured and mounted to one of said first and second holding plates to allow said one of said first and second plates to pivot relative to said support arm about an axis parallel to the central axis of a disk being gripped;

at least two posts disposed on the first plate to contact the outer circumferential surface of a disk from a first direction; and a compliant spool disposed on the second plate to contact the outer circumferential surface of a disk from a second direction.

14. An apparatus as recited in claim 13 further comprising:

a first arm having a first end and a second end;

a second arm having a first end and a second end;

the first end of the first arm connected to the first plate at a first plate pivot point; and the first end of the second arm connected to the second plate at a second plate pivot point;

wherein the first holding plate pivots about the first plate pivot point and the second holding plate pivots about the second plate pivot point.

15. An apparatus as recited in claim 14 further comprising a support structure wherein:

the first arm is attached to the support structure between its first and second end at a first arm pivot point; and the second arm is attached to the support structure between its first and second end at a second arm pivot point.

16. An apparatus as recited in claim 14 further comprising an actuator connected to the first arm at its second end and connected to the second arm at its second end.

17. An apparatus as recited in claim 14 further comprising shock absorber connected to the first arm between the first arm pivot point and the first plate pivot point and connected to the second arm between the second arm pivot point and the second plate pivot point.

18. An apparatus as recited in claim 13 wherein the first and second holding plates are bidirectionally movable in a first direction.

19. An apparatus as recited in claim 18 wherein the first and second holding plates are bidirectionally movable in a second direction.

20. An apparatus as recited in claim 13 wherein the first and second holding plates pivot about axes parallel to the axis of a disk.

21. An apparatus for gripping a disk comprising:

a first holding plate and a second holding plate, the first and second plates being substantially co-planar and substantially parallel to a disk;

at least two posts disposed on the first plate to contact the outer circumferential surface of a disk from a first direction;

a compliant spool disposed on the second plate to contact the outer circumferential surface of a disk from a second direction;

a first arm having a first end and a second end;

a second arm having a first end and a second end;

the first end of the first arm connected to the first plate at a first plate pivot point; and the first end of the second arm connected to the second plate at a second plate pivot point, wherein the first holding plate pivots about the first plate pivot point and the second holding plate pivots about the second plate pivot point.

22. An apparatus as recited in claim 21 further comprising a support structure wherein:

the first arm is attached to the support structure between its first and second end at a first arm pivot point; and the second arm is attached to the support structure between its first and second end at a second arm pivot point.

23. An apparatus as recited in claim 21 further comprising an actuator connected to the first arm at its second end and connected to the second arm at its second end.

24. An apparatus as recited in claim 21 further comprising shock absorber connected to the first arm between the first arm pivot point and the first plate pivot point and connected to the second arm between the second arm pivot point and the second plate pivot point.

25. An apparatus for coaxially aligning a central opening in a disk having an outer edge about a male member, comprising:

a disk holding member defining an open section configured and dimensioned to receive at least a portion of said male member, said open section including a guide surface for contacting the male member; and a disk positioning element mounted on the disk holding member and defining a reference surface disposed a predetermined distance from said guide surface such that contact between the disk outer edge and said positioning element reference surface locates the disk central opening with respect to said guide surface, whereby the disk central opening is aligned about the male member when the male member is received in the open section and contacted by the guiding surface.

26. The apparatus according to claim 25, further comprising a disk retaining element mounted on the holding member and positioned to retain the disk by contact with the disk along its outer edge, said retaining element being configured and dimensioned to retain the disk adjacent the holding member and disk positioning element.

27. The apparatus according to claim 26, wherein:

the disk holding member comprises first and second disk holding parts positioned adjacent to one another along adjacent edges;

the open section is defined by opposed recesses, one in each of said first and second part adjacent edges, to form an female guide member configured and dimensioned to receive the male member; and the disk retaining element is mounted on one of said first and second parts, and a compliant retaining element is mounted on the opposite part cooperating with said retaining element to retain the disk adjacent to the holding member and bias the disk against the positioning element.

28. The apparatus according to claim 25, further comprising a guide ball, having an outer surface, disposed on the holding member in the open section, wherein said guide ball outer surface forms the guide surface.

29. The apparatus according to claim 25, further comprising a conical male guide member mounted on the male member, said male guide member being slidingly received in the open section to align the male member with a disk mounted on the holding member.

30. An apparatus for coaxially aligning a central opening in a disk about rotatable disk holder, said disk having an outer edge spaced away from the central opening, said apparatus comprising:

a conical male guide member disposed at an end of the rotatable disk holder, concentric with said rotatable disk holder;

a disk holding member comprising first and second disk holding parts positioned adjacent to one another along adjacent edges, said adjacent edges each defining opposed recesses to form an open female guide member configured and dimensioned to receive the conical male guide member, wherein the first disk holding part, along its recessed edge in the female guiding member, defines a guide surface for contacting the male member;

a disk positioning element mounted on the first disk holding part and defining a reference surface disposed a predetermined distance from said guide surface such that contact between the disk outer edge and said positioning element reference surface locates the disk central opening with respect to said guide surface;

a disk retaining element mounted on the first disk holding part and positioned to retain the disk by contact with the disk along its outer edge, said retaining element being configured and dimensioned to retain the disk adjacent the holding member and disk positioning element; and a compliant retaining element mounted on the second disk holding part cooperating with said retaining element to retain the disk adjacent to the holding member and bias the disk against the positioning element.

* * * * *